United States Patent [19]

Krufka

[11] Patent Number: 4,692,605

[45] Date of Patent: Sep. 8, 1987

[54] SYSTEM FOR FINE FOCUSING A CAMERA ON A MOVING CURVED SURFACE

[75] Inventor: Frank S. Krufka, Mount Joy, Pa.

[73] Assignee: RCA Corporation, Princeton, N.J.

[21] Appl. No.: 832,129

[22] Filed: Feb. 24, 1986

[51] Int. Cl.$^4$ .................. G03B 3/10; G01N 21/00; H04N 17/00

[52] U.S. Cl. .................. 250/201; 354/402; 358/227; 358/10

[58] Field of Search .............. 250/201, 562–563, 250/572, 578; 356/239; 358/10, 106, 107, 227; 354/400, 402

[56] References Cited

U.S. PATENT DOCUMENTS

| 4,525,735 | 6/1985 | Krufka | 358/10 |
| 4,563,088 | 1/1986 | Gullman | 356/244 |
| 4,635,124 | 1/1987 | Andreatti, Jr. et al. | 358/227 |

Primary Examiner—Edward P. Westin
Attorney, Agent, or Firm—E. M. Whitacre; D. H. Irlbeck; L. L. Hallacher

[57] ABSTRACT

A system for fine focusing a camera on one surface of a moving curved transparent object includes a digital storage device. The focusing range of the camera is stored in the storage device. A thickness transducer provides a signal representative of the thickness of the object and a displacement transducer provides a signal representative of the distance between the object and the camera. The thickness and the displacement signals are added and provided to the storage device. When the added value is outside the stored range the camera is focused to cause the added value to fall at the middle of the range.

8 Claims, 4 Drawing Figures

|     | D0 | D1 | D2 | D3 | D4 | D5 | D6 | D7 |
|-----|----|----|----|----|----|----|----|----|
| 112 | 1  | 1  | 1  | X  | X  | X  | X  | X  |
| 111 | 1  | 1  | 1  | X  | X  | X  | X  | X  |
| 110 | 0  | 0  | 0  | X  | X  | X  | X  | X  |
| 109 | 0  | 0  | 0  | X  | X  | X  | X  | X  |
| 108 | 0  | 0  | 0  | X  | X  | X  | X  | X  |
| 107 | 0  | 0  | 0  | X  | X  | X  | X  | X  |
| 106 | 0  | 0  | 0  | X  | X  | X  | X  | X  |
| 105 | 0  | 0  | 0  | X  | X  | X  | X  | X  |
| 104 | 0  | 0  | 0  | X  | X  | X  | X  | X  |
| 103 | 0  | 0  | 0  | X  | X  | X  | X  | X  |
| 102 | 0  | 0  | 0  | X  | X  | X  | X  | X  |
| 101 | 0  | 0  | 0  | X  | X  | X  | X  | X  |
| 100 | 0  | 0  | 0  | X  | X  | X  | X  | X  |
| 99  | 0  | 0  | 0  | X  | X  | X  | X  | X  |
| 98  | 0  | 0  | 0  | X  | X  | X  | X  | X  |
| 97  | 0  | 0  | 0  | X  | X  | X  | X  | X  |
| 96  | 0  | 0  | 0  | X  | X  | X  | X  | X  |
| 95  | 0  | 0  | 0  | X  | X  | X  | X  | X  |
| 94  | 0  | 0  | 0  | X  | X  | X  | X  | X  |
| 93  | 0  | 0  | 0  | X  | X  | X  | X  | X  |
| 92  | 0  | 0  | 0  | X  | X  | X  | X  | X  |
| 91  | 0  | 0  | 0  | X  | X  | X  | X  | X  |
| 90  | 0  | 0  | 0  | X  | X  | X  | X  | X  |
| 89  | 1  | 1  | 0  | X  | X  | X  | X  | X  |

DATA BUS

*Fig. 3*

SYSTEM FOR FINE FOCUSING A CAMERA ON A MOVING CURVED SURFACE

BACKGROUND

This invention relates generally to focusing a lensing mechanism and particularly to a system for fine focusing a camera onto the surface of a moving curved transparent object, such as the faceplate for a kinescope.

During the production of picture tubes for color television receivers, a black matrix is applied to the inside surface of the faceplate. The black matrix consists of parallel lines which extend vertically, as defined by the viewing orientation of the tube. The black lines are spaced at desired intervals leaving transparent glass in the spaces between the lines. The transparent spaces are coated with slurries of material containing phosphors which emit the primary colors of light when impacted by electrons. Three phosphors are alternately applied in a repetitive sequence such as red, green and blue to all the transparent spaces of the panel. Prior to the application of the phosphors, it is desirable to measure the widths of the transparent spaces, and the opaque matrix lines, to verify that they are within acceptable dimensional tolerances to avoid the expensive application of the phosphors to improperly matrixed faceplates.

When measuring the line widths and space widths, the faceplate panel is placed between a stationary light source and a light detector which is included in a focusing lensing mechanism. Light is passed through the spaces of the matrix and focused on the light detector. A portion of the panel is scanned with light in a direction substantially perpendicular to the matrix lines and variations in light caused by the opaque lines and transparent spaces are detected by the detector and provided to a measuring system. A system which operates in this manner is fully described in U.S. Pat. No. 4,525,735.

With the system described in the above-referenced patent, the panel is moved to various positions and the scanning and measuring steps are repeated at each position. The panel surface is curved and, therefore, linear motion of the faceplate with respect to the detector causes the distance between the panel and the detector to vary and the projection of the matrix lines onto the elements of the detector does not remain in focus. For this reason the relative motion of the panel and the detector is accomplished utilizing a device which maintains a curved surface a constant distance from a stationary point. A device which accomplishes such motion is fully described in U.S. Pat. No. 4,563,088. U.S. Pat. Nos. 4,525,735 and 4,563,688 are incorporated herein by reference.

The system described in U.S. Pat. No. 4,525,735 is very satisfactory for measuring and tracking the matrix lines and phosphor space widths for consumer type television receivers. However, tubes utilized in monitor type receivers contain very fine phosphor and matrix lines. For this reason, a different type lens with a smaller depth of focus is used than is used for consumer type tubes. Accordingly, when measuring and tracking the bar widths of display types of tubes, dynamic focusing which is finer than that obtainable from commercially available focusing circuits is required in order to compensate for small distant changes between the camera and the panel, and also to compensate for waviness of the glass of which the panel is composed. For these reason, there is a need for a system for dynamically fine focusing a camera on a moving curved transparent surface. The present invention fulfills this need.

SUMMARY

A system for fine focusing a lensing mechanism on one surface of a curved transparent object as the object moves, whereby the distance between the object and the lensing mechanism varies, includes a displacement transducer for providing a displacement signal representative of the distance between the object and the lensing system. A thickness transducer provides a thickness signal representative of the thickness of the object. A focusing circuit means is responsive to the displacement signal and to the thickness signal and fine focuses the lensing mechanism in accordance with changes in the displacement and thickness signals.

BRIEF DESCRIPTION OF THE DRAWINGS

FIG. 3 shows how the storage device is programmed in accordance with the invention.

DETAILED DESCRIPTION

Figure 1:
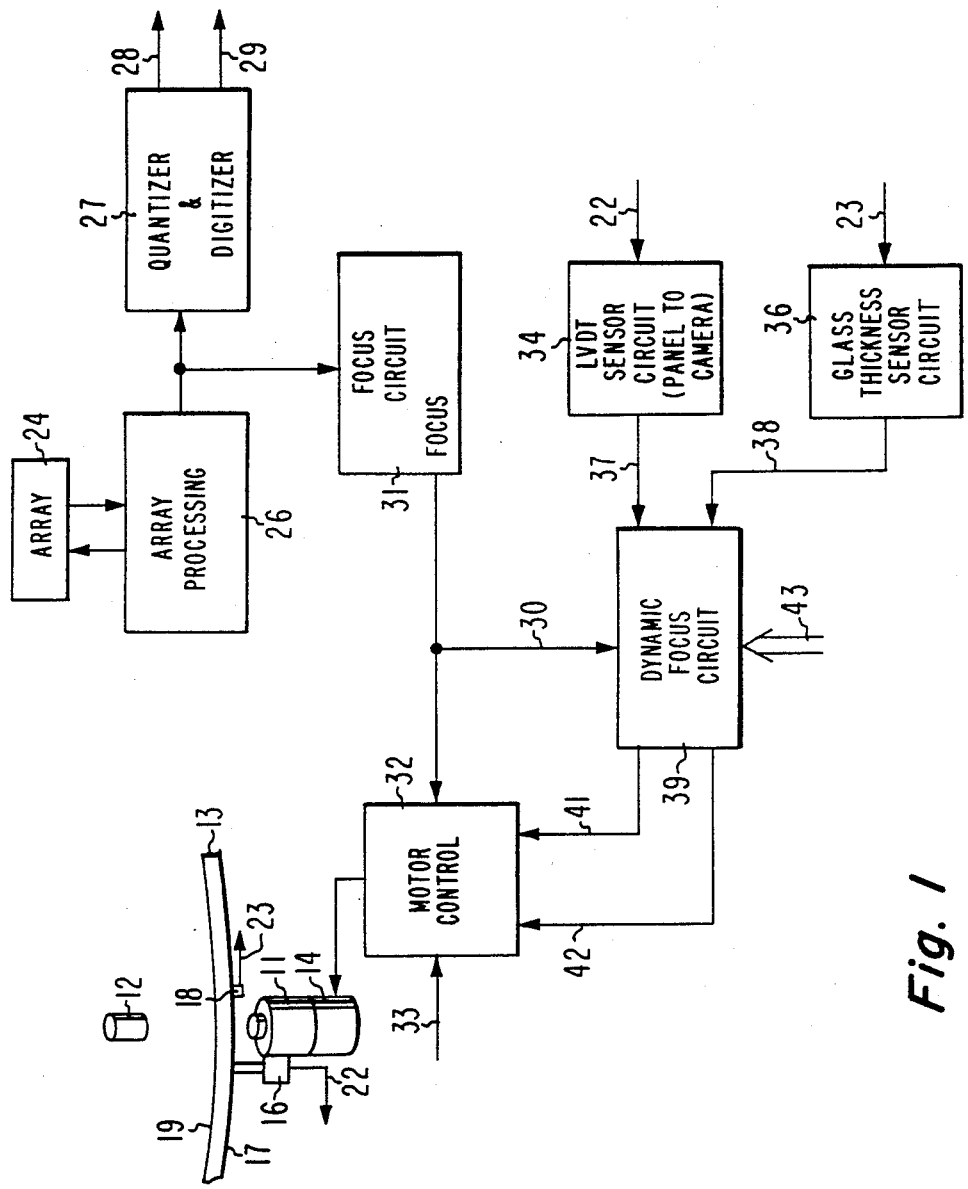
FIG. 1 is a block diagram of a system for measuring and identifying lines and spacings on a curved surface, in which the present invention can be utilized.

FIG. 1 is a simplified block diagram of a system for measuring and identifying line spacing on a curved transparent surface which is fully described in U.S. Pat. No. 4,525,735. The system includes a camera 11 and a light source 12. A curved transparent object 13, which is illustrated as a portion of a faceplate panel for a kinescope, is arranged between the camera 11 and the light source 12. The camera 11 is focused by a lens motor 14 that moves the lens in the camera up or down to focus. The transparent object 13, preferably, is supported by a device (not shown) for maintaining a moving curved surface a substantially constant distance from the camera 11, such as the device described in U.S. Pat. No. 4,563,088. A displacement transducer 16, which can be a linear voltage differential transformer (LVDT), is arranged to contact the surface 17 of the object 13 which is closest to the camera 11. A thickness transducer 18, which can be an ultrasonic transducer, detects ultrasonic energy reflected from the inside surface 19 of the object 13, the pattern being measured is arranged on surface 19. The transducers 16 and 18 are fixed with respect to the camera 11 and thus, preferably, are supported by the device which supports the object 13. The displacement transducer 16 provides an output signal representative of the distance between the surface 17 and the camera 11 on an output line 22. The thickness transducer 18 provides an output signal representative of the thickness of the object 13 on an output line 23. Both the transducers 16 and 18 are commercially available items, for example a Model ME501 provided by Nikon can be used for the displacement transducer 16 and a model CL204 provided by Krautkramer Branson Company can be used for the thickness transducer 18.

The camera 11 includes a light sensitive array 24 upon which the lensing mechanism focuses the pattern present on the inside surface 19 of the object 13. The array 24 is shown separate from the camera 11 for convenience of illustration. The array 24 can be a charge coupled device (CCD) or a linear photodiode array.

The image data from the array are is provided to an array processing circuit 26, the output of which is provided to a quantizer and digitizer 27. Output lines 28 and 29 of the quantizer and digitizer 27 are coupled to data processing circuitry, as fully described in U.S. Pat. No. 4,525,735.

The output of the array processing circuit 26 is also provided to a focus circuit 31, which is in the purview of one skilled in electronics. For consumer type receivers, the focus circuit 31 is capable of maintaining the needed focusing of the camera 11 as the panel is in motion. However, for monitor displays, which have fine line screens, the focusing provided by the focus circuit 31 when the surface is in motion, is insufficient. The utilization of the displacement transducer 16 and the thickness transducer 18 along with a dynamic focus circuit 39 provides the required additional fine focusing.

The output of the focus circuit 31 is provided to a motor control 32, which is controlled by a system computer (not shown) by way of an input line 33. The output of the LVDT displacement transducer 16 is provided by the line 22 to a LVDT sensor circuit 34. Similarly, the output of the thickness transducer 18 is provided to a glass thickness sensor circuit 36 by way of the line 23. The LVDT sensor circuit 34 and the glass thickness sensor 36 provide binary coded decimal signals (BCD) on the ouput lines 37 and 38, respectively, to the dynamic focus circuit 39. The dynamic focus circuit 39 actuates the camera focus motor 14 through the motor control 32 and output lines 41 and 42 to cause the motor to travel the distance and in the direction required to keep the camera 11 in optimum focus. The dynamic focus circuit 39 responds to commands of the system computer by way of an input bus 43.

Figure 2:
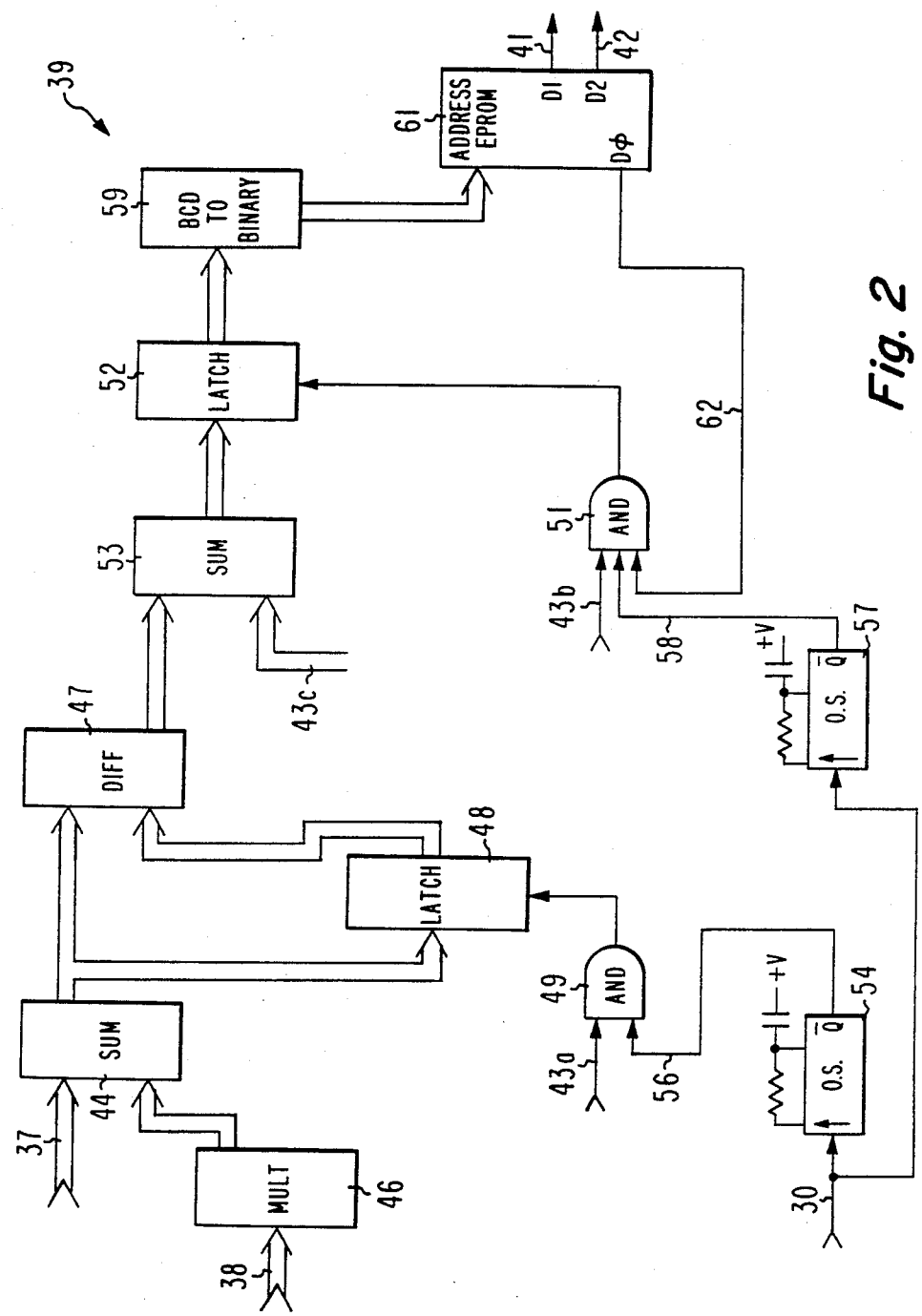
FIG. 2 is a block diagram of a preferred embodiment of a dynamic focusing system.

FIG. 2 is a preferred embodiment of the dynamic focus circuit 39 of FIG. 1. The displacement signal on the line 37 is provided to a summing circuit 44. The thickness signal on the line 38 is applied to a multiplier circuit 46. The multiplier circuit is used to compensate for the index of refraction of the glass of which the object 13 is fabricated. The output of the multiplier 46 is added to the displacement signal by the summing circuit 44. The added displacement output of the summing circuit 44 is applied to a difference circuit 47 and to a latch circuit 48, the output of which is input to the difference circuit 47. An input line 43a, which is contained within the input bus 43 (FIG. 1), is applied to an AND gate 49. The output of the AND gate 49 is coupled to the set input of the latch 48. An AND gate 51 receives an input from the system computer on an input line 43b, which also is part of the input bus 43. The output of the AND gate 51 is coupled to the set input of a latch circuit 52, which receives an input from a summing circuit 53. The summing circuit 53 receives the output of the difference circuit 47 and also an input from the system computer via a bus 43c.

The AND gate 49 receives a second input from a one shot 54 over a line 56. Similarly, the AND gate 51 receives an input from a one shot 57 over line 58. Both the one shots 54 and 57 are energized by the focus circuit 31 (FIG. 1) and the line 30. The output of the latch circuit 52 is coupled to a BCD to binary converter 59 the output of which is coupled to the address bus of an EPROM 61. The $D\phi$ output of the EPROM 61 is provided as an input to the AND gate 51 by the line 62. The D1 and D2 outputs of the EPROM 61 on lines 41 and 42 are used to turn the lens motor 14 on and to control the direction in which the motor 14 rotates to fine focus the lens of camera 11 in accordance with the magnitude and direction of the variation in the distance between the camera 11 and the surface 19 of the object 13.

Prior to initiating the system, a center value EPROM address, which represents the center of the depth of focus distance between the surface 19 of the object 13 and the camera 11, is provided by the system computer to the summing circuit 53 by way of the input bus bar 43c. Thus, this value is determined by the lens characteristics of the camera 11 and is changed any time the lens of camera 11 is changed.

In operation, when the object 13 is initially placed upon the carrying device, the object is at rest and the camera 11 is fine focused. At this time, the input signals from the computer to the AND gates 49 and 51 on the lines 43a and 43b, respectively, are low. The signal to the one shots 54 and 57 from the focus circuit 31 on line 30 also are low. Accordingly, the outputs of the AND gates 49 and 51 are low. The latches 48 and 52, therefore, are enabled and the outputs follow the input signals. A short delay after the focus signal, the input lines 43a and 43b of the AND gates 49 and 51, respectively, go high. When focus occurs the signal on input line 30 to the one shots 54 and 57 goes high and the Q-bar outputs of the one shots briefly go LO, then back high. The AND gate 49 is thus enabled whereby the output goes high and the latch circuit 48 latches onto the input signal from the sum circuit 44. This signal is the optimum focus value set into the system for the particular camera/panel position. The AND gate 51 is not enabled because the $D\phi$ output from EPROM 61 on line 62 remains low. Under these conditions, the two inputs to the difference circuit 47 are the same and the output is zero. Accordingly, the output of summing circuit 53 is identical to the input from the computer on bus 43c, which is the optimum EPROM address for the lens used. The output of latch 52 follows the input and the optimum EPROM address is provided to the EPROM 61 through the BCD to binary converter 59. As the panel begins to move, the signals from the transducers 16 and 18 begin to vary and the difference circuit 47 provides a difference signal to the summing circuit 53. The difference signal is algebraically added to the center EPROM address value on bus 43c and the output changes. The change in the sum circuit 53 output is provided to the EPROM 61 through the latch 52 and the BCD to binary converter 59. The EPROM 61 is programmed in a manner described hereinafter with respect to FIG. 3. When the difference in the distance between the surface 19 and the camera 11 exceeds the permissible programmed tolerance, the outputs $D\phi$, D1, and D2 of the EPROM 61 change state. The $D\phi$ output on line 62 goes high thereby enabling AND gate 51 and causing latch 52 to latch onto the value provided by the sum circuit 53. Simultaneously, the D1 and D2 outputs on lines 41 and 42 change state to actuate the motor control 32 and cause the lens motor 14 to rotate in the required direction to either increase or decrease the distance between the surface 19 and the camera 11.

FIG. 3 is useful in understanding how the EPROM 61 is programmed for a tolerance suitable for the camera lens being used. The optimum, or center, focus distance for the camera 11 is programmed at address 100 as a binary number representative of the optimum focus distance. Addresses 101 to 110 are individually programmed with binary numbers representing one mil incremental increases in the distance between the surface 19 and the camera 11. Thus, for the example shown, a ten mil increase is permissible. Similarly, addresses 99 through 90 are programmed in one mil increments representative of decreasing distances between the surface 19 and the camera 11. When the binary number provided by the BCD to binary converter 59 is within the 10 mil tolerance, the Dφ, D1 and D2 outputs of the EPROM 61 are zero, or low, as shown in FIG. 3. When an 11 or greater mil change occurs, either address 89 or 111 is reached, depending upon whether the change is a decrease or an increase. When the distance has increased and address 111 is reached the Dφ, D1 and D2 outputs of the EPROM 61 all go high to cause motor 14 to rotate and decrease the lens distance to a fine focus value. Similarly, when address 89 is reached because of an 11 mil, or greater, decrease in the distance between the surface 19 and the camera 11, the Dφ and D1 outputs of EPROM 61 go high and cause motor 14 to increase the distance to the fine focus value. The D2 output remains low and the motor rotates in the direction needed to increase the distance between the surface 19 and the camera 11. The correction is made to the optimum value at address 100 because when the lens moves, the focus circuit 31 provides a focus signal on line 30 when the system is again fine focused. This causes the $\overline{Q}$ output of one shots 54 and 57 to go LO then High, latching the new optimum focal value in latch 48. The output of difference circuit 47 is again zero. Thus the output of SUM circuit 53 is again EPROM address 100, the output of latch 52 is allowed to follow the input while $\overline{Q}$ of 57 was low thus enabling the EPROM address to change putting Dφ low and enabling latch 52 to follow the input from sum 53 again.

Figure 4:
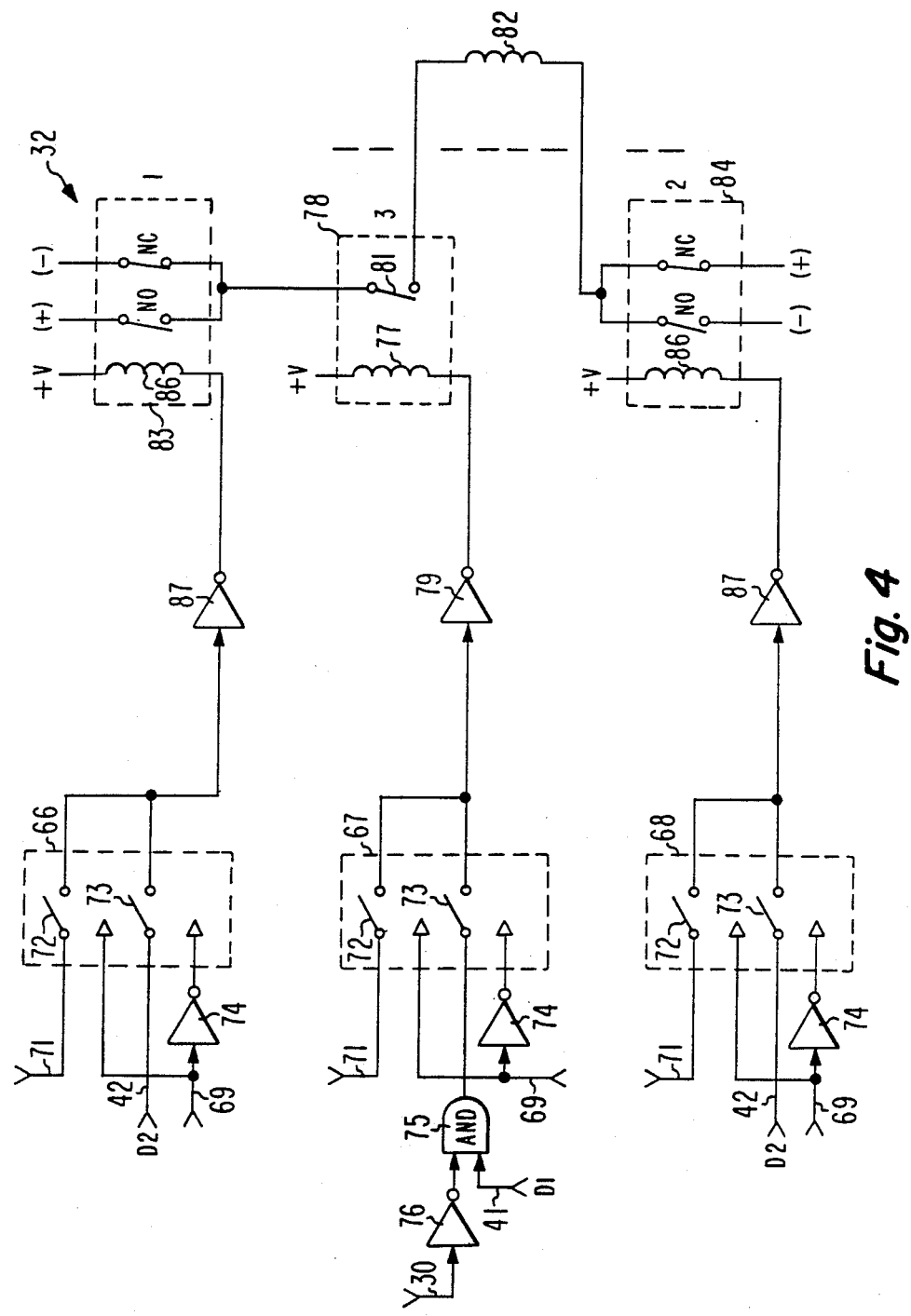
FIG. 4 is a simplified showing of the focus motor control circuit.

FIG. 4 shows the motor control circuit 32 in more detail. The control includes three solid state switches 66, 67, and 68. Each of the switches 66, 67 and 68 includes the equivalents of movable contacts 72 and 73 and also an input line 69, which receives a stationary/move signal from the system computer. The stationary/move signal from the computer is low whenever the object 13 is moving and is high when the object is not moving. When the stationary move signal is high, the contacts 72 are closed and the camera 11 can be focused by the normal focus circuit alone. When the stationary/move signal on the input line 69 is low, because the object 13 is moving, the outputs of the inverters 74 are high and the contacts 73 are closed and dynamic focusing can take place. Switches 66 and 68 receive the D2 output from the EPROM 61 on the line 42. The switch 67 receives the D1 output of the EPROM on line 41 through an AND gate 75. The AND gate 75 also receives the focus signal on the line 30 from focus circuit 31 through an inverter 76.

When the D1 output on line 41 of the EPROM 61 goes high, one input of the AND gate 75 is enabled. Simultaneously, the focus signal on line 30 is low and the other input of AND gate 75 is high because of the inverter 76. The AND gate 75 therefore is enabled and the coil 77 of the switch 78 is energized through the inverter 79. The relay 81 closes and the coil 82 of the camera motor 14 is connected to a power supply by two relays 83 and 84. Both of the relays 83 and 84 have a normally open contact and a normally closed contact. The normally open and normally closed contacts of the two relays 83 and 84 are oppositely voltage biased. The relays 83 and 84 are actuated by the D2 output signal from the EPROM 61 on the line 42. Accordingly, when the D2 signal is high, and the switches 73 are closed, the coils 86 of the relays 83 and 84 are energized because of the inverters 87. Current then passes through the focus motor coil 82 from relay 83 to relay 84. When the D2 signal on the line 42 is low, the coils 86 are not energized and current passes through the focus motor coil 82 from relay 84 to relay 83.

What is claimed is:

1. A system for fine focusing a lensing mechanism on one surface of a curved transparent object as said object moves with respect to said lensing mechanism whereby the distance between the other surface of said object and said lensing mechanism varies, said system comprising:
   displacement transducer means for providing a displacement signal representative of the distance between said other surface and said lensing system;
   thickness transducer means for providing a thickness signal representative of the thickness of said object; and
   focusing circuit means, responsive to said displacement signal and to said thickness signal, for fine focusing said lensing mechanism in accordance with changes in said displacement and thickness signals.

2. The system of claim 1 wherein said displacement transducer means and said thickness transducer means provide digital output signals.

3. The system of claim 2 wherein said digital output signals are binary coded decimal, (BCD) and wherein said focusing circuit means includes BCD to binary conversion means and, binary circuit means for focusing said lensing mechanism in respones to said binary signals.

4. The system of claim 3 wherein said focusing circuit means includes adder circuit means for adding said displacement signal and said thickness signal to provide an added displacement signal.

5. The system of claim 4 wherein said binary circuit means includes binary storage means for storing a range of displacement tolerances whereby said binary storage means causes focusing of said lensing mechanism when said added displacement signal is outside said range of displacement tolerances.

6. A system for fine focusing a camera, having a focusing motor, onto one surface of a transparent panel as the distance between the other surface of said transparent panel and said camera varies, comprising:
   thickness transducer means for providing a digital thickness signal representative of the thickness of said panel;
   displacement transducer means for providing a digital displacement signal representative of the displacement between said other surface and said camera; and
   digital circuit means responsive to said digital signals, said digital circuit means including means for adding said digital signals to provide an added displacement signal, said digital circuit means also including signal storage means for storing a range of displacements whereby said signal storage means actuates said focusing motor when said added displacement signal is outside said range of displacements to focus said camera and cause said added displacement signal to fall within said range.

7. The system of claim 6 wherein said displacement transducer and said thickness transducer provide binary coded decimal (BCD) outputs, and wherein said digital circuit means includes BCD to binary conversion means.

8. The system of claim 7 wherein said signal storage means is a binary storage device, and wherein said storage means stores an optimum displacement value in accordance with the characteristics of said camera at a particular address, and additional displacement values at additional addresses on both sides of said particular address whereby said additional addresses define said range, and whereby added actual distance signals outside said range are indicative of the magnitude and direction of needed focusing.

* * * * *